United States Patent [19]

Oosterling et al.

[11] 4,083,257
[45] Apr. 11, 1978

[54] AGRICULTURAL IMPLEMENT

[75] Inventors: Pieter Adriaan Oosterling, Nieuw-Vennep; Antoine Marinus Rene Baecke, Hoofddorp, both of Netherlands

[73] Assignee: Multinorm B.V., Nieuw-Vennep, Netherlands

[21] Appl. No.: 582,978

[22] Filed: Jun. 2, 1975

[30] Foreign Application Priority Data

| Jun. 4, 1974 | Netherlands | 7407518 |
| Jun. 4, 1974 | Netherlands | 7407517 |
| Jun. 4, 1974 | Netherlands | 7407516 |

[51] Int. Cl.² .................................. F16H 23/00
[52] U.S. Cl. ............................ 74/60; 239/670
[58] Field of Search .............. 239/670, 677, 684; 74/60

[56] References Cited

U.S. PATENT DOCUMENTS

| 1,730,165 | 10/1929 | Rhodes | 74/64 |
| 1,764,266 | 6/1930 | Karnasch | 74/64 |
| 1,901,981 | 3/1933 | Ousbäck | 74/60 |
| 2,550,872 | 5/1951 | Shaw | 239/670 |
| 3,036,837 | 5/1962 | Miller | 239/670 |
| 3,395,866 | 8/1968 | Sousek et al. | 239/670 |

*Primary Examiner*—Samuel Scott
*Assistant Examiner*—Wesley S. Ratliff, Jr.
*Attorney, Agent, or Firm*—Snyder, Brown & Ramik

[57] ABSTRACT

The invention relates to an agricultural implement comprising a tool oscillating about a vertical axis, for example a spreading pipe of a fertilizer distributor, a mechanism for producing the oscillatory movement of the tool being formed by a rotatably driven flywheel and a coupling element eccentrically in said flywheel and engaging the tool or a holder thereof at a distance to said axis, and comprising a frame carrying the tool and the driving mechanism; the objects of the invention are to provide an improved frame, flywheel and toolholder respectively in particular the arrangement of the bearings relative to each other in order to achieve a more quiet run of the implement resulting in a light weight construction, longer lifetime and lower cost price.

38 Claims, 7 Drawing Figures

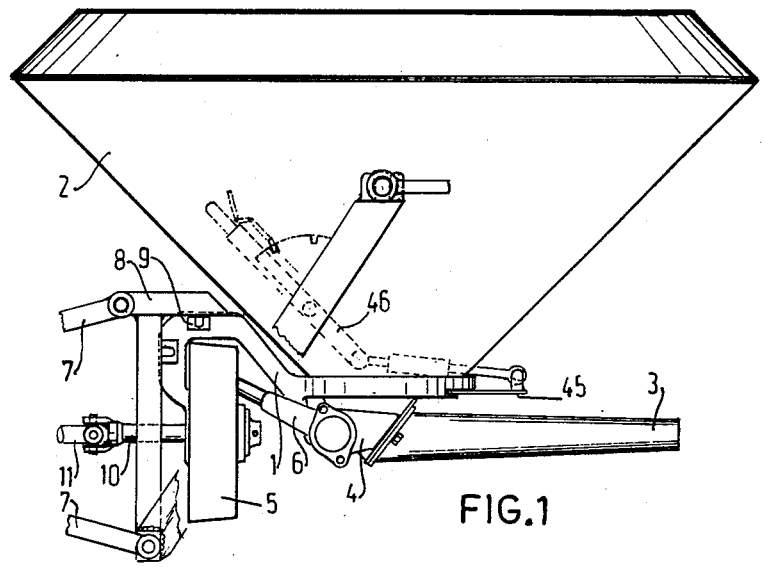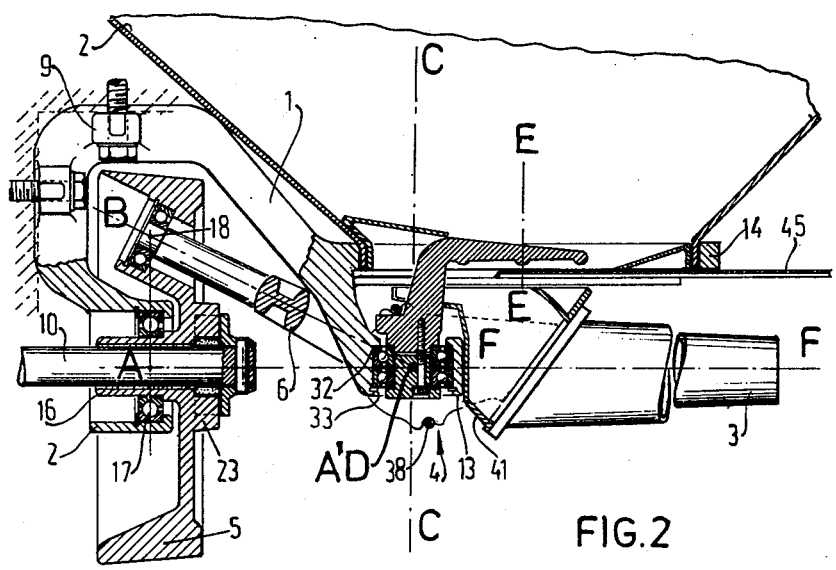

AGRICULTURAL IMPLEMENT

The invention relates to an agricultural implement comprising a tool oscillating about a vertical axis, for example a spreading pipe of a fertilizer distributor, a mechanism for producing the oscillatory movement of the tool being formed by a rotatably driven flywheel and a coupling element eccentrically in said flywheel and engaging the tool or a holder thereof at a distance to said axis and comprising a frame carrying the tool and the driving mechanism.

The prime object of the invention is to provide a simpler frame than that of the prior-art agricultural implements and to improve the functional features thereof so that a more advantageous engagement of dynamic forces is obtained. This results in a more quiet run of the agricultural implement so that its lifetime will be longer, whilst simpler and hence cheaper bearing means will satisfy. Owing to the advantageous design the number of component parts of the whole device can be reduced, which involves a low cost price.

The invention provides an agricultural implement whose frame comprises a first annular support for holding the flywheel bearing and a second support for holding the swing bearing of the tool support, the centre line of the first annular support being located in the central perpendicular plane of the swing bearing.

Owing to this specific disposition of the bearings relative to one another the inertia forces of the various reciprocating parts of the agricultural implement are prevented from producing additional bending forces in the bearing stub of the tool and in the bearing holder of the frame respectively.

According to the invention the frame is preferably constructed in the form of at least one curved, bar-shaped body, at the ends of which are arranged the first support and the second support respectively.

If the agricultural implement is a fertilizer distributor comprising a reciprocating spreading pipe, it is preferred to fasten the mass of the implement, that is to say, mainly the mass of the hopper for the fertilizer, which is stationary with respect to the oscillatory movement, to the frame at a point as near as possible to the second support for the swing bearing of the spreading pipe. For this purpose the frame is provided near said second support with supporting means for securing the hopper.

In a second preferred embodiment of the invention two curved, bar-shaped bodies are provided between the first and second annular support for the flywheel bearing and the swing bearing respectively, which two bodies are extending out of the vertical plane through the axis of said annular supports. This embodiment is advantageous when fast oscillating tools are used as the frame is more rigid.

In order to obtain a correct disposition of the supports of the various bearings and the hopper supporting means with respect to one another the bar-shaped frame together with the supports and the supporting means is, in accordance with the invention, made as a single unit by casting.

Further, the invention has for its object to simplify the flywheel for said driving mechanism so that the number of parts for the bearing of the flywheel itself and of the coupling element journalled therein is reduced.

The invention provides such a flywheel design that the flywheel can run quietly so that the lifetime of the various bearings is prolonged.

For this purpose the invention provides an agricultural implement in which the flywheel is provided with a hub firmly fitting around a drive shaft constructed in the form of a bearing stub shaft.

In contrast to the flywheel bearing in known driving mechanisms of the kind set forht above, in which the flywheel is fastened to the end of a driving shaft, which itself is held in bearings, the flywheel itself is directly held in a bearing so that the driving shaft is free of additional bending loads due to the weight of the flywheel and the rotating, eccentric mass of the coupling element and the reactive forces of the driving torque.

The flywheel is preferably shaped in the form of a dish, the hub constructed in the form of a stub shaft being located in said dish. Owing to this design a very simple and light-weight bearing will suffice, since the centre of gravity of the flywheel is located substantially in the radial supporting plane of the bearing so that in operation a substantially reaction-free rotation is obtained.

This advantageous load pattern on the rotary bearing of the flywheel is further improved in accordance with the invention by arranging the centre of the bearing of the coupling element eccentrically affecting the flywheel also in the radial supporting plane of the rotary bearing of the flywheel.

In order to absorb shocks in the driving shaft the latter is preferably connected with the flywheel by an elastic coupling. This flexible coupling in accordance with the invention comprises an externally toothed element connected with the shaft and an internally toothed element connected with the hub. One of these two elements may be made of flexible material. Otherwise it is preferred to arranged a separate flexible element between the toothings of the two elements.

A particularly cheap construction is obtained when the internally toothed element forms part of the flywheel hub.

A further object of the invention is to improve the structure of the tool support so that less material is required and hence the weight, that is to say, the mass to be accelerated and decelerated is reduced, which results in a more quiet operation. A further result is that the lifetime of the various hinge points and bearings is prolonged, whilst the bearings can be made simpler and cheaper.

The invention provides an agricultural implement whose tool support is characterized in that it is provided with a bearing stub, the central vertical plane of which goes through the pivotal point.

With this structure the load on the wing bearing of the tool support applies at the centre so that additional bending moments producing additional stress in the bearing stub are avoided.

When the coupling element is constructed in the form of a fork, which engages the tool support at two diametrically opposite pivotal points lying symmetrically to the stub, the tool support is provided at each pivotal point with an eyelet for holding a pivotal stub provided at each end of the fork.

A particularly light-weight structure is obtained by connecting only the eyelets and the bearing stub of the support at the upper ends with one another by means of a strip-shaped web. The lightness of the structure is further improved by constructing the fork with diverging stubs. The fork thus has a reduced width, which considerably reduces the inertia forces produced by the reciprocatory swinging movements about the vertical axis.

In order to facilitate mounting the pivotal stubs, and, if necessary, the bearing stub of the support are constructed in divided form.

In order to ensure a firm and rugged structure the eyelets of the support are subjected to pre-stresses acting in directions towards one another by means of stressing members. In this way any play between support and fork is avoided, which might otherwise occur due to the comparatively thin web eccentrically fastened to the eyelet in operation.

If the agricultural implement constitutes a spreading device for distributing fertilizer or the like, the tool has the form of a spreading pipe fastened to the tool. The support is provided for this purpose at each eyelet with an elongated supporting element fastened at an angle to the web and terminating in a fastening surface.

If the spreading device is provided with a hopper having its outlet port above the tool support, a guide member, preferably of a material of low specific weight is arranged in accordance with the invention between the web and the supporting elements of the spreading pipe, said guide member conveying the material to be distributed from the outlet port of the hopper towards the inlet opening of the spreading pipe. The advantage obtained by the support embodying the invention is that the guide member is mainly located on the same side of the vertical axis of the reciprocatory movements of the support as the spreading pipe so that the delivery of the material to be distributed can be performed undisturbed. In the devices hitherto known material located on the other side of the pivotal axis would accumulate on said side and hamper an undisturbed passage of the material.

In order to ensure a uniform load on the swing bearing the fastening surface of the supporting elements of the tool support is arranged so that the centre line of the spreading pipe is located in the central perpendicular plane of the bearing stub. In this way additional bending moments on the bearing stub are avoided.

In order to further improve a uniform flow of the material to be distributed the support is provided with an agitator extending as far as into the hopper. This agitator is reciprocated with the same frequency as the tool support, it then being advantageous to construct the end of the agitator remote from the supporting member in the form of a bar, extending at a given distance above the supporting elements and parallel thereto. In this way said end is operative in the lower part of the hopper and ensures a uniform flow irrespective of the degree of filling of the hopper whilst in addition any lumps are broken up.

In roder to reduce the cost of production and to diminish the number of parts the tool support embodying the invention comprising the web, eyelets, bearing stub, supporting elements and agitator is an integral casting.

According to an other embodiment the guide member also forms a part of above mentioned unitary casting, in order to achieve a rigid connection between the web, eyelets, and supporting elements.

Further features of the invention will become apparent from the following description of two embodiments of an agricultural implement forming a fertilizer distributor in accordance with the invention. In the drawing:

FIG. 1 is a side elevation of a first embodiment of the agricultural implement according the invention.

FIG. 2 is an enlarged vertical sectional view of the agricultural implement of FIG. 1.

Figure 3:
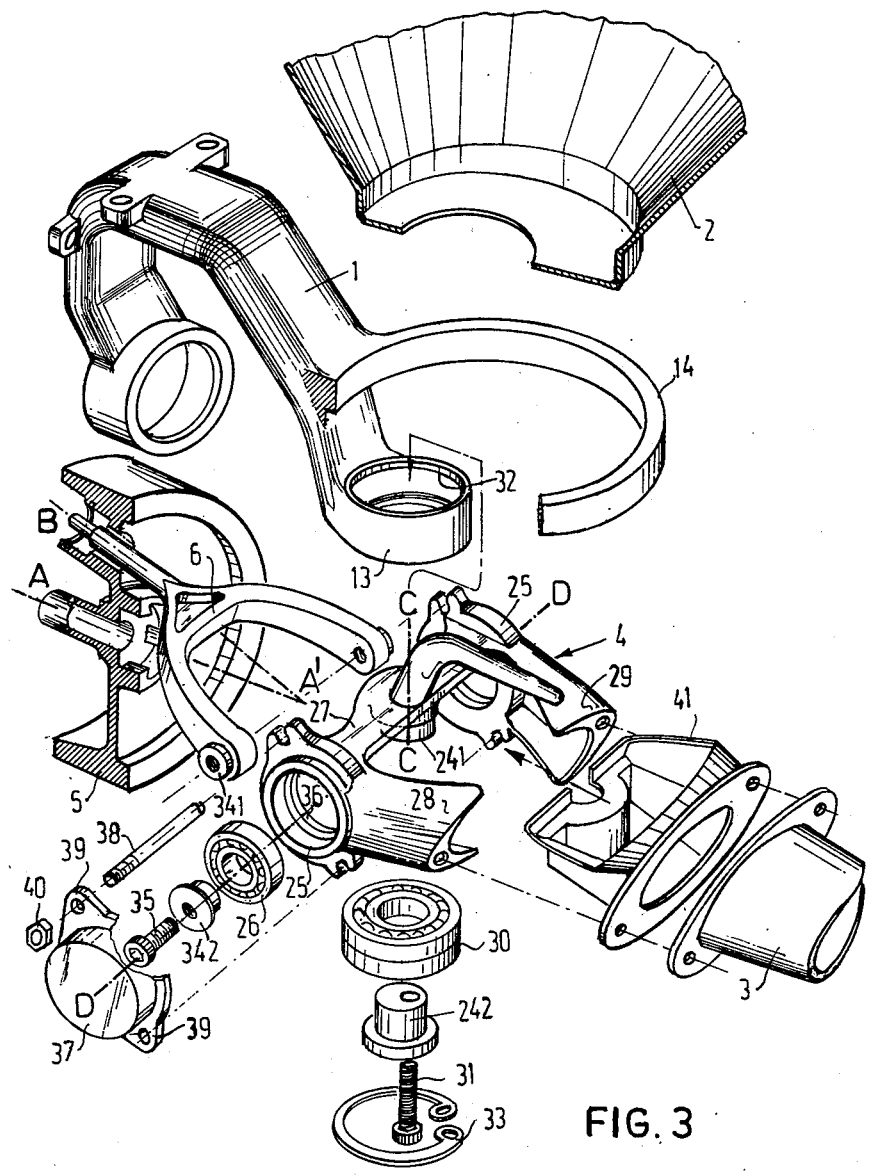
FIG. 3 is a perspective and exploded view of the agricultural implement of the preceding Figures.

The agricultural implement according to the invention, described herein by way of a first example, is a fertilizer distributor comprising mainly a frame 1 holding the further elements of the implement, that is to say, the hopper 2, the spreading pipe 3 with a support 4, the flywheel 5 with a coupling element 6. The frame 1 is carried by a frame 8 fastened to the three-point suspension 7 of an agricultural tractor, the frame 1 being secured to the frame 8, for example, by means of bolts 9. The flywheel 5 is rotatably driven by a driving shaft 10, which is connected through a coupling element with the power take-off shaft 11 of the agricultural tractor. It should be noted that the frame 8 may have any design: for example, it may be self-riding, whilst the driving shaft 10 may be caused to rotate by any suitable means.

The frame 1 essentially formed by a bar-shaped body bent over in a suitable manner (see FIGS. 2 and 3), the ends being provided with an annular support 12 for holding the bearing of the flywheel 5 and with a support 13 for holding the swing bearing of the tool or the tool support 4 respectively, the latter support also being annular in this embodiment. According to one aspect of the invention the centre line of the support 12 is located in the central perpendicular plane of the support 13 (see the dot-and-dash line A—A', indicating partly the centre line and partly the line of intersection of the central perpendicular plane with the plane of the drawing).

According to a further aspect of the invention a part of the frame 1 in the immediate proximity of the support 13 is provided with a supporting member 14 for positioning the fertilizer hopper held by a strut of the frame 8. In the embodiment shown this supporting member 14 has an annular shape, its centre line E—E being substantially parallel to the centre line C—C of the support 13.

In a part located between the two supports 12 and 13 the bar-shaped frame 1 has a bend of about 90°, on either side of which fastening means are provided for firmly securing the frame 1 to the supporting frame 8. The fastening means are preferably formed by projecting ears 15 provided on the bar-shaped frame 1, said ears receiving fastening bolts 9.

The frame 1 together with the supports 12, 13 and 14 and the ears 15 can be effectively cast as a single unit.

Figure 4:
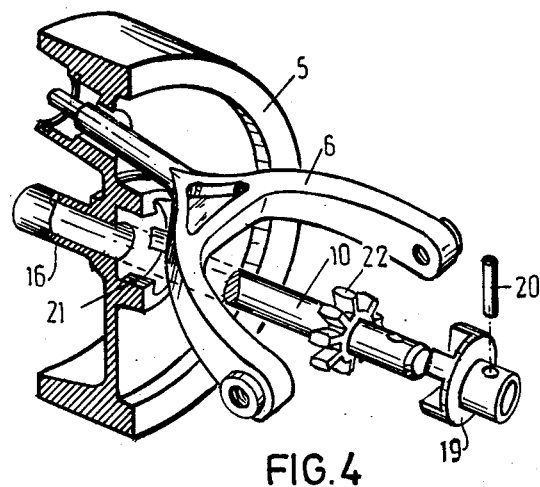
FIG. 4 is a perspective and exploded view of a detail in FIG. 3, showing flywheel and coupling.

The flywheel is shown in detail in FIGS. 2, 3 and 4. The flywheel 5, in accordance with a main feature of the invention, is provided with a hub 16 serving as a bearing stub, fitting around the driving shaft 10. The bearing in this embodiment is a single-row ball bearing 17, the outer ring of which is held in an annular support 12 of the frame 1, whereas the inner ring directly receives the hub 16.

The coupling element 6, formed in this embodiment by a fork engaging a tool holder 4 on either side of its pivotal axis C—C, has its stem eccentrically journalled in the flywheel 5 so that upon rotation of the flywheel the centre line of the fork stem describes a conical plane.

On feature of the invention is that the centre of the bearing 18 for the fork stem is located in the radial supporting plane of the bearing 17. The line A—B in FIG. 2 indicates the line of intersection of said supporting plane with the plane of the drawing. The flywheel 5 has the shape of a dish, the part of the hub 16 serving as a bearing stub being located in the dished space.

The driving shaft 10 is fastened to the flywheel 5 via a toothed coupling (FIG. 4), whose coupling part having external toothing 19 is arranged by a pin 20 on the end of the shaft 10, whereas the coupling part 21 having internal toothing directly forms part of the hub 16. Between the two toothings is arranged a flexible body 22, for example, of rubber.

Between the remaining part of the hub 16 and the part of the driving shaft 10 located therein there is arranged a sleeve 23 with low friction coefficient in order to allow small relative turns of the driving shaft 10 with respect to the flywheel 5.

In the prime embodiment the tool support 4 comprises a bearing stub 24, divided into two portions 241 and 242 in order to facilitate mounting of the support in the frame 1 (FIG. 3). The support 4 is furthermore provided with two eyelets 25 located diametrically opposite one another with respect to the stub 24 for receiving a roller bearing 26, which serves as a pivotal joint between the coupling element 6 and the tool support 4.

The top ends of the eyelets 25 and the stub 24 are interconnected by a plate-shaped web 27. Each eyelet 25 is furthermore provided with a supporting element 28, which is at an angle to the web 27, the two supporting elements extending in the same direction. The supporting elements 28 terminate in a fastening surface 29, to which the tool 3, in this case a spreading pipe, can be secured, for example, by bolts.

On the bearing stub 24 of the tool support 4 is arranged a roller bearing, in this case, two identical ball bearings 30, which are fixed in place by the stub portion 242 inserted from below and the passing bolt 31, screwed into the stub portion 241. The bearing 30 is mounted in an annular support 13 of the frame 1 and held therein between a shoulder 32 and a circlip 33.

In this agricultural implement the coupling element 6 is formed by a fork, the ends of which are each provided with a bearing stub 34. The stub 34 is divided into a portion 341 fastened to the fork and a loose portion 342. The roller bearing 26 is fastened to the stub by means of the bolt 35 passed through the loose portion 342 and screwed into the fixed portion 341. The bearing 26 is held in place in the eyelet 25 of the tool support 4 between a shoulder 36 of the eyelet 25 and a cover 37 closing the eyelet 25 on the outer side. The two covers 37 on the outer side are drawn to one another by two pull rods 38, which are located diametrically opposite one another and are passed through ears 39 of the cover 37, a nut 40 being screwed onto each screw-threaded end of the pull rod 38. Owing to this pre-stressing structure it is ensured that despite its comparatively light structure the support 4 can absorb heavy forces, whilst play-free mounting of the bearings 26 in the eyelets 25 is obtained. This means that the lifetime of the pivotal points 25, 26 and 34 is prolonged and that these points can be implemented in a simple manner. Owing to the outwardly extending bearing stubs 34 the fork 6 may have a small width so that inertia forces are reduced.

The fork stem of the coupling element 6 is journalled eccentrically in the flywheel 5 so that upon rotation of the flywheel 5 about its centre line A—A' the centre line B-A' describes a conical plane. Owing to this movement the support 4 will swing about the vertical pivotal axis C—C, the stubs 34 thus also swinging about the axis D—D in the eyelets 25.

An essential feature of the invention is that the axes A—A', B-A', C—C and D—D intersect one another at the same point, which is, moreover, located in the central perpendicular plane of the bearing stub 24.

When the driving mechanism depicted above is employed in a fertilizer distributor shown in FIG. 1, the frame 1 is provided with a supporting member 14 for the hopper 2 for the fertilizer. The tool is formed by a spreading pipe 3, whilst a guide element 41 is arranged between the outlet port of the hopper 2 and the inlet opening of the spreading pipe 3. This guide element 41, preferably made of a material of low specific weight, is arranged between the supporting elements 28 projecting from the eyelets and the web 27. The supporting element 41 is furthermore provided with a flange so that the guide element 41 can be fastened by the same bolts as used for fastening the spreading pipe 3 to the supporting elements 28 at the fastening surface 29.

Since the guide element 41 together with the spreading pipe 3 is located on the same side of the pivotal axis C—C, an undisturbed passage of the material to be spread, the fertilizer, is ensured, because the accelerating effect of the oscillatory movement on the fertilizer is already felt when the material is located in the guide element 41.

At its side remote from the bearing stub 24 the web 27 is provided with an agitator 42, which extends in the preferred embodiment as far as into the hopper 2, it is true, but the end of which is bent over towards the supporting elements 28 so that said end extends substantially parallel to said supporting elements. The end of the agitator thus moves substantially in the plane of the outlet port of the hopper 2, any non-uniform passage of the material to be spread being thus avoided. Moreover, said end reciprocates with the same speed as the tool support 4.

One of the essential features of the invention is that the tool support 4 is formed by a single case unit together with the bearing stub 24, the eyelets 25, the web 27 and the supporting elements 28 and the agitator 42. It should be noted that the fastening surface 29 is arranged so that the centre line F—F of the spreading pipe 3 also passed through the point of intersection of the further centre lines, so that it is also located in the central perpendicular plane of the stub 24.

It is preferred to construct the free end of the agitator with a "loosening" profile in cross section, which is important in casting as well as in the operation so that no material will stick to the agitator.

Figure 5:
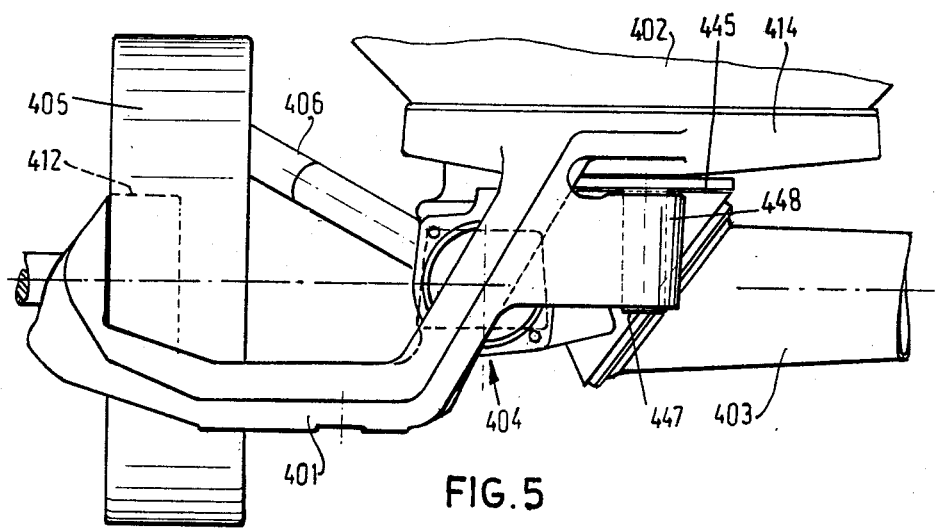
FIG. 5 is a side elevation, corresponding with FIG. 1, of a second embodiment of an agricultural distributor.
Figure 6:
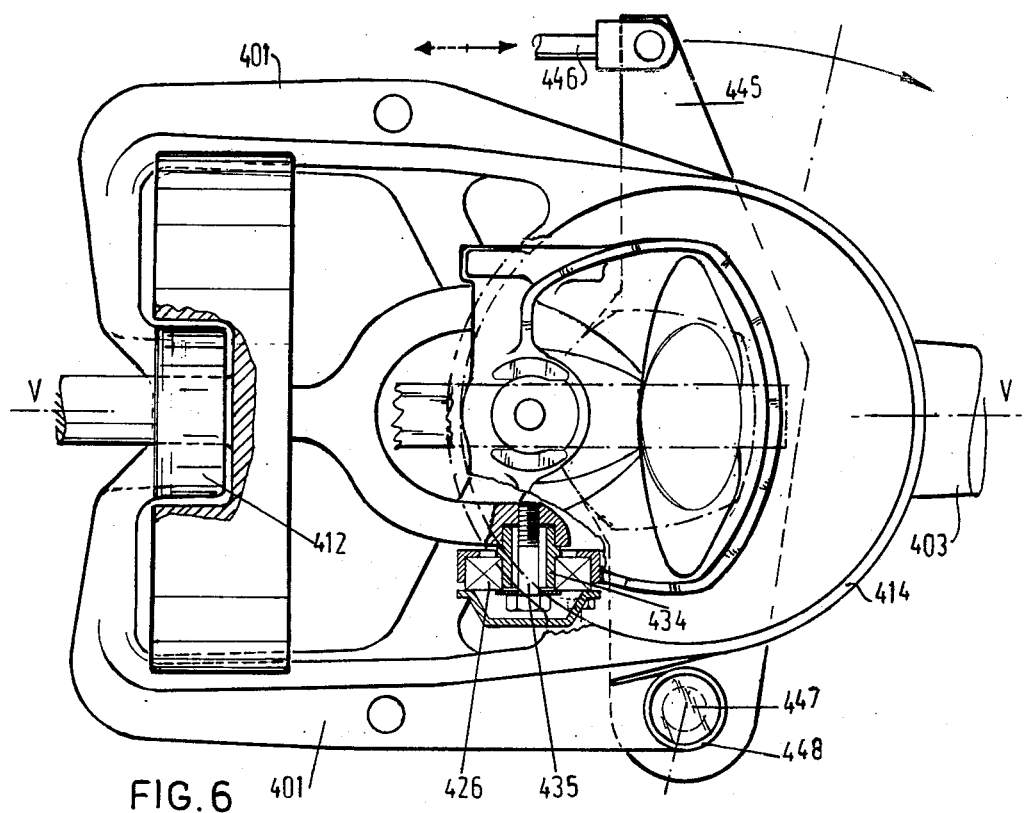
FIG. 6 is a plan view, partly in intersection, of the implement in FIG. 5.
Figure 7:
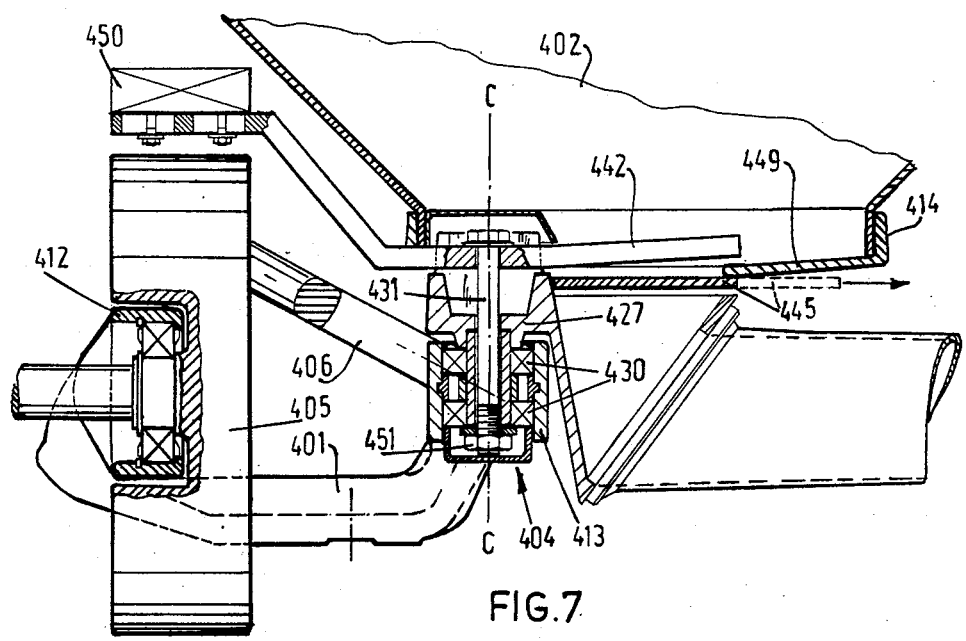
FIG. 7 is a vertical sectional view of the implement in FIG. 5.

Referring now to FIGS. 5, 6 and 7, the second embodiment of the invention is also applied to a fertilizer distributor.

The prime difference with the above described first embodiment is the frame construction. Instead of one curved, bar-shaped body between the first support 412 of the flywheel bearing and the second support 413 of the swing bearing of the tool holder 403, in the present embodiment two curved, bar-shaped bodies are arranged so, that they extend at a distance to the vertical plane (V—V) through the both bearing axis, FIG. 6. This arrangement is very advantageous when fast oscillating tools are used as the frame is more resistant now to bending and torsional forces.

The agitator 442 is bolted by means of a tensioning bolt 431 on the tool holder 404, FIG. 7, and is provided with a counter-balance 450, located above the flywheel 405, and mounted on an forward extension opposite to the active portion of the agitator 442. The counter balance is adapted to balancing the oscillating mass.

The tensioning bolt 431 is passed through the stub 424 and by fastening the nut 451 on the threaded portion of the bolt the loose portion of the stub 424, both roller bearings 430 as well as the agitator 442 are fixed to the tool holder 404 simultaneously.

The separating plane of the outwardly directed fork stubs 434 of the coupling element 406 does not lie outside the fork but is countersunk therein. A bolt 435 screwed in the fork, is adapted to secure the roller bearing 426 and the loose portion of the stub 434 to the fork, FIG. 6.

A further essential feature of the second embodiment according to the invention is the unitary casting formed by the tool holder and the guide element 441 for guiding the fertilizer on its way from the hopper 402 to the spreading pipe 403. The unitary casting results in a more rigid tool holder as is important using fast oscillating tools.

Further the invention relates a dosing member to dosing the mass flow of the fertilizer through the spreading pipe. The said dosing member is according to the invention movably from and towards the vertical swing axis C—C of the tool holder and located at the same side of said axis C—C as the spreading pipe is positioned. The first embodiment of the dosing member according to the FIGS. 1-4 consists of a rectilinear sliding plate 45 engaged by a control mechanism 46, adapted to be adjusted in order to bring the slide-plate in distinct dosing positions. The second embodiment of the dosing member according to FIGS. 5-7 consists of a swingable plate 445 turning about a pin 447, passed through a casted eyelet 448 of the tool holder 404. The control mechanism 446 engages the dosing plate at a distance from the pin 447.

The annular hopper support 414 is provided with a bottom wall 449 preferably arched, FIG. 7, having an aperture to be closed by said dosing member 445. Said aperture is also located at the same side as the spreading pipe 403 in relation to the swing axis C—C. This arrangement causes the fertilizer to flow undisturbed from hopper to spreading pipe. The bottom wall 449 is preferably casted as unitary casting with the frame 401.

The invention is, of course, not only suitable for use in the agricultural distributor described above, since it may also be employed for a multi-beam harrow, the harrow beams performing an oscillatory movement by means of a flywheel shown in the Figures, a coupling element and a tool support, which is caused to reciprocate. A frame required for such a device differs from the embodiment shown in that the annular support 14 for the hopper 2 is dispensed with. The further features with their advantages are maintained.

What is claimed is:

1. In an agricultural implement, the combination of:
 a frame having an annular first bearing support and a second bearing support displaced from the first support;
 a flywheel journalled in said first bearing support about a generally horizontal first axis;
 an oscillatory tool journalled in said second support about a generally vertical second axis which lies in a plane also containing said first axis; and
 a coupling element eccentrically journalled in said flywheel and connected to said tool in laterally spaced relation to said second axis;
 said second support being located relative to said first support such that a plane passing centrally through said second support and perpendicular to said second axis contains said first axis.

2. In an agricultural implement as defined in claim 1 wherein said coupling element is in the form of a fork straddling said second axis and pivotally connected to said tool about a third axis orthogonal to said first and second axes and meeting at a common point therewith.

3. An agricultural implement as claimed in claim 1 characterized in that the frame is constructed as at least one bent, bar-shaped body, one end of which is provided with the first support and the opposite end of which is provided with the second support.

4. An agricultural implement as claimed in claim 1 employed as a fertilizer distributor comprising a hopper, characterized in that near the second support the frame is provided with supporting means for said hopper.

5. An agricultural implement as claimed in claim 4, characterized in that the second support has an annular shape.

6. An agricultural implement as claimed in claim 5, characterized in that the bottom wall in the annular supporting means is arched.

7. An agricultural implement as claimed in claim 4, characterized in that the centre line of the supporting means is parallel to the second axis.

8. An agricultural implement as claimed in claim 7 wherein said tool is a generally horizontal spreading pipe communicating with said hopper, and the hopper being provided with a bottom wall having an aperture located at the same side as the spreading pipe in relation to said second axis.

9. An agricultural implement as claimed in claim 7, characterized in that the flexible coupling comprises an externally toothed element connected with the shaft and an internally toothed element connected with the hub.

10. An agricultural implement as claimed in claim 9, characterized in that a flexible element, for example, of rubber is arranged between the toothings of the two elements.

11. An agricultural implement as claimed in claim 10 characterized in that the internally toothed element forms part of the hub.

12. An agricultural implement as claimed in claim 11, characterized in that a lining or a sleeve with low friction coefficient is arranged between the remaining part of the hub and the part of the shaft located therein.

13. An agricultural implement as claimed in claim 1 characterized in that in a part located between the two supports the frame is bent over through an angle of 90° and is provided on either side of said bend with fastening means.

14. An agricultural implement as claimed in claim 13, characterized in that the frame together with the first and the second support, the fastening means and the supporting means for the hopper is made as a single unit by casting.

15. An agricultural implement as claimed in claim 13, chacterized in that said fastening means are formed by ears projecting from either side of the bar-shaped body.

16. An agricultural implement as claimed in claim 1, characterized in that the flywheel is provided with a hub fitting around a driving shaft and being constructed in the form of a bearing stub shaft.

17. An agricultural implement as claimed in claim 16, characterized in that the flywheel is constructed in the form of a dish, the part of the hub serving as a bearing stub projecting inside said dish.

18. An agricultural implement as claimed in claim 16, characterized in that the centre of the bearing of the coupling element is located in the radial supporting plane of the flywheel bearing.

19. An agricultural implement as claimed in claim 18, characterized in that both the flywheel bearing and the bearing of the coupling element are single-row ball bearings.

20. An agricultural implement as claimed in claim 16, characterized in that the driving shaft is connected through a flexible coupling with the hub of the flywheel.

21. An agricultural implement as claimed in claim 1, in which the coupling element is engaging the tool support at least at one pivotal point at the side of said vertical axis, characterized in that the tool support is provided with a bearing stub, the central perpendicular plane of which goes through the pivotal point.

22. An agricultural implement as claimed in claim 21, in which the coupling element is constructed in the form of a fork which engages the support at two diametrically opposite pivotal points located symmetrically to the stub, characterized in that each pivotal point is formed by an eyelet arranged at a distance from the bearing stub of the support and adapted to receive a bearing stub fastened to each end of the fork.

23. An agricultural implement as claimed in claim 22, characterized in that the top ends of the eyelets and the bearing stubs are connected with one another by a strip-shaped web.

24. An agricultural implement as claimed in claim 23, characterized in that the pivotal stubs of the fork are directed away from one another.

25. An agricultural implement as claimed in claim 23, characterized in that a guide member is arranged between the web and the supporting elements are conveying the material to be spread on the side of the vertical pivotal axis facing the spreading pipe from the outlet port of the hopper towards the inlet of the spreading pipe.

26. An agricultural implement as claimed in claim 24, characterized in that the stubs of the fork are divided.

27. An agricultural implement as claimed in claim 26, characterized in that the stub of the support is divided.

28. An agricultural implement as claimed in claim 27, characterized in that the eyelets of the tool support are loaded by pre-stresses directed towards one another by stressing members.

29. An agricultural implement as claimed in claim 28, characterized in that the stressing members are formed by a cover for each eyelet and at least one pull rod to be clamped against the covers.

30. An agricultural implement as claimed in claim 23, characterized in that at an angle to the web each eyelet is provided with an elongated supporting element terminating in a fastening surface.

31. An agricultural implement as claimed in claim 22, characterized in that the tool support consisting of the web eyelets bearing stub supporting elements and guide member is cast as a single unit.

32. An agricultural implement as claimed in claim 21, characterized in that the support is provided with an agitator means extending as far as into the hopper.

33. An agricultural implement as claimed in claim 32, characterized in that the agitator is arranged on the side of the web remote from the bearing stub.

34. An agricultural implement as claimed in claim 32, characterized in that the end of the agitator has the shape of a bar and extends at a given distance above the supporting elements and parallel thereto.

35. An agricultural implement as claimed in claim 22, characterized in that the tool support consisting of the web, eyelets, bearing stub, supporting elements and agitator is cast as a single unit.

36. An agricultural implement as claimed in claim 32, characterized in that said agitator means is bolted on the tool support.

37. An agricultural implement as claimed in claim 36, characterized in that the active portion of said agitation means is extended in forward direction beyond said swing axis, which extension is provided with a counter balance.

38. In an agricultural implement, the combination of:
a unitary frame member having a first arm portion and a generally horizontally extending second arm portion joined with said first arm portion, said arm portions lying in mutually perpendicular planes, said first arm portion having a first annular bearing support defining a generally horizontal first axis and said second arm portion having a second annular bearing support spaced horizontally from said first support and defining a generally vertical second axis;
a flywheel journalled in said first bearing support about said first axis;
an oscillatory tool journalled in said second bearing support about said second axis;
a coupling element eccentrically journalled in said flywheel and connected to said tool in laterally spaced relation to said second axis; and
said second bearing support being located such that a transverse plane passing centrally therethrough and perpendicular to said second axis contains said first axis.

* * * * *